United States Patent
Goodman et al.

(10) Patent No.: US 7,568,123 B2
(45) Date of Patent: Jul. 28, 2009

(54) APPARATUS, SYSTEM, AND METHOD FOR BACKING UP VITAL PRODUCT DATA

(75) Inventors: Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/014,530

(22) Filed: Dec. 15, 2004

(65) Prior Publication Data

US 2006/0129613 A1    Jun. 15, 2006

(51) Int. Cl.
 *G06F 11/00* (2006.01)
(52) U.S. Cl. .......................................................... 714/6
(58) Field of Classification Search ............... 714/1–100
 See application file for complete search history.

(56) References Cited

U.S. PATENT DOCUMENTS

| | | | |
|---|---|---|---|
| 6,115,648 A * | 9/2000 | Gallo ........................... | 700/218 |
| 6,625,703 B2 | 9/2003 | Goodman et al. ............ | 711/162 |
| 7,171,467 B2 * | 1/2007 | Carley .......................... | 709/224 |
| 2002/0188894 A1 | 12/2002 | Goodman ...................... | 714/43 |
| 2003/0163508 A1 | 8/2003 | Goodman .................... | 709/100 |
| 2003/0236933 A1 * | 12/2003 | Shigeta et al. ................ | 710/72 |
| 2004/0078455 A1 | 4/2004 | Eide et al. .................... | 709/223 |
| 2004/0122914 A1 * | 6/2004 | Williams ..................... | 709/217 |
| 2005/0015678 A1 * | 1/2005 | Miller .......................... | 714/38 |
| 2005/0210316 A1 * | 9/2005 | Benhase et al. ................ | 714/6 |
| 2006/0053177 A1 * | 3/2006 | Suomela et al. ............. | 707/204 |
| 2006/0112226 A1 * | 5/2006 | Hady et al. .................. | 711/130 |

* cited by examiner

*Primary Examiner*—Scott T Baderman
*Assistant Examiner*—Jigar Patel
(74) *Attorney, Agent, or Firm*—Kunzler & McKenzie

(57) ABSTRACT

An apparatus, system, and method are disclosed for backing up vital product data for a data processing device. A communication module establishes a communications channel with a maintenance module of a service center. The service center remotely supports the data processing device. A backup module copies vital product data to the maintenance module and the maintenance module maintains the vital product data copy. In one embodiment, a restore module receives a command to restore the vital product data copy. The communication module establishes the communications channel between the restore module and the maintenance module and the maintenance module copies the vital product data copy to the restore module.

29 Claims, 10 Drawing Sheets

APPARATUS, SYSTEM, AND METHOD FOR BACKING UP VITAL PRODUCT DATA

BACKGROUND OF THE INVENTION

1. Field of the Invention

This invention relates to backing up vital data and more particularly relates to backing up vital product data to a service center.

2. Description of the Related Art

The operation of a data processing device such as a computer, a computer network, a data storage device and the like is regulated by configuration data and operational parameters, referred to herein as vital product data ("VPD"). The VPD is essential to proper operation of the data processing device, regulating internal functions, and interactions with associated devices. For example, VPD may be physical parameters in an automated data storage library, specifying logical associations or fiducial coordinates that are unique to each library. The VPD may also be the IP address of a web server, or a partitioning scheme unique to a storage device. The VPD is typically critical to the proper operation of the data processing device, but often comprises a small amount of data.

To protect the VPD from accidental loss or corruption, the VPD is regularly backed up. For example, the customer or owner of the data processing device may back up an the VPD to a hard disk, magnetic tape, or other storage medium as is known to those of skill in the art. Unfortunately, manual operations such as this are often overlooked, resulting in a down-level backup or no backup at all. In addition, VPD comprises data required for the proper operation of the system, and the customer or owner of the system may not have the wherewithal to correctly perform a backup of the VPD, or to correctly identify that a restore is needed, or to correctly perform the restore operation once needed. In another example of backing up the VPD, the VPD may be copied to another component of the system.

Unfortunately, because both the VPD and the VPD backup copy are often co-located within the same device or physical location, both the VPD and the VPD backup copy may be lost. For example, if a single storage device were to store both the VPD and the VPD backup copy, the loss of the storage device would preclude restoration of the VPD. Alternatively, a corrupted VPD may be copied to the VPD backup copy, resulting in two corrupted instances of the VPD. The VPD and VPD backup copy may also both be lost or corrupted through human error.

From the foregoing discussion, it should be apparent that a need exists for an apparatus, system, and method that backs up VPD to an easily accessible remote site to protect against the loss of the VPD and the VPD backup copy. Beneficially, such an apparatus, system, and method would regularly preserve one or more VPD copies in an off-site location.

SUMMARY OF THE INVENTION

The present invention has been developed in response to the present state of the art, and in particular, in response to the problems and needs in the art that have not yet been fully solved by currently available backup systems. Accordingly, the present invention has been developed to provide an apparatus, system, and method for backing up VPD that overcome many or all of the above-discussed shortcomings in the art.

The apparatus to backup VPD is provided with a logic unit containing a plurality of modules. These modules in the described embodiments include a communication module, a backup module, and a maintenance module.

The communication module establishes a communications channel between the backup module and the maintenance module. A data processing device may comprise the backup module and the communication module and a service center may comprise the maintenance module. The service center is configured to provide support for the data processing device. For example, the service center may diagnose failures in the data processing device and schedule service or order replacement components.

The backup module copies data processing device VPD from the data processing device to the maintenance module. In one embodiment, the backup module appends state information to the VPD. The state information may include a time stamp. In addition, the state information may include a configuration description.

The maintenance module maintains the VPD copy. In addition, the maintenance module may maintain a plurality of VPD copy instances. In one embodiment, the apparatus includes a check module configured to establish communications with the communication module and request the backup module copy the VPD to the maintenance module if communications has not established communications with the maintenance module within a specified time interval. The apparatus copies VPD to a service center and maintains one or more VPD copy instances at the service center.

A system of the present invention is also presented to backup VPD. The system may be embodied in a data processing device and a service center. In particular, the system, in one embodiment, includes a data processing device comprising an application module, a communication module, and a backup module, and a service center comprising a maintenance module and a check module.

The application module performs a specified function and may utilize VPD. For example, the data processing device may be a server running a web server application module and the VPD may be an IP address. The communication module establishes a communications channel between the data processing device and the service center. The communications channel may be a telephone connection, an Internet connection and the like. The backup module copies the VPD from the data processing device to the service center. The maintenance module maintains the VPD copy.

A method of the present invention is also presented for backing up VPD. The method in the disclosed embodiments substantially includes the steps necessary to carry out the functions presented above with respect to the operation of the described apparatus and system. In one embodiment, the method includes establishing a communications channel, copying VPD, and maintaining the VPD copy.

A communication module establishes a communications channel between a data processing device backup module and a service center maintenance module. The backup module copies VPD to the maintenance module. The maintenance module maintains the VPD copy.

In one embodiment, a data processing device restore module receives a restore command. The restore command may specify a VPD copy instance. In a certain embodiment, the restore module selects the VPD copy instance. In addition, the communication module establishes a communications channel between the restore module and the maintenance module. The maintenance module further copies the VPD copy to the restore module and the restore module restores the VPD copy to the data processing device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention backs up VPD to a service center. In addition, the present invention may restore the VPD in response to a command. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
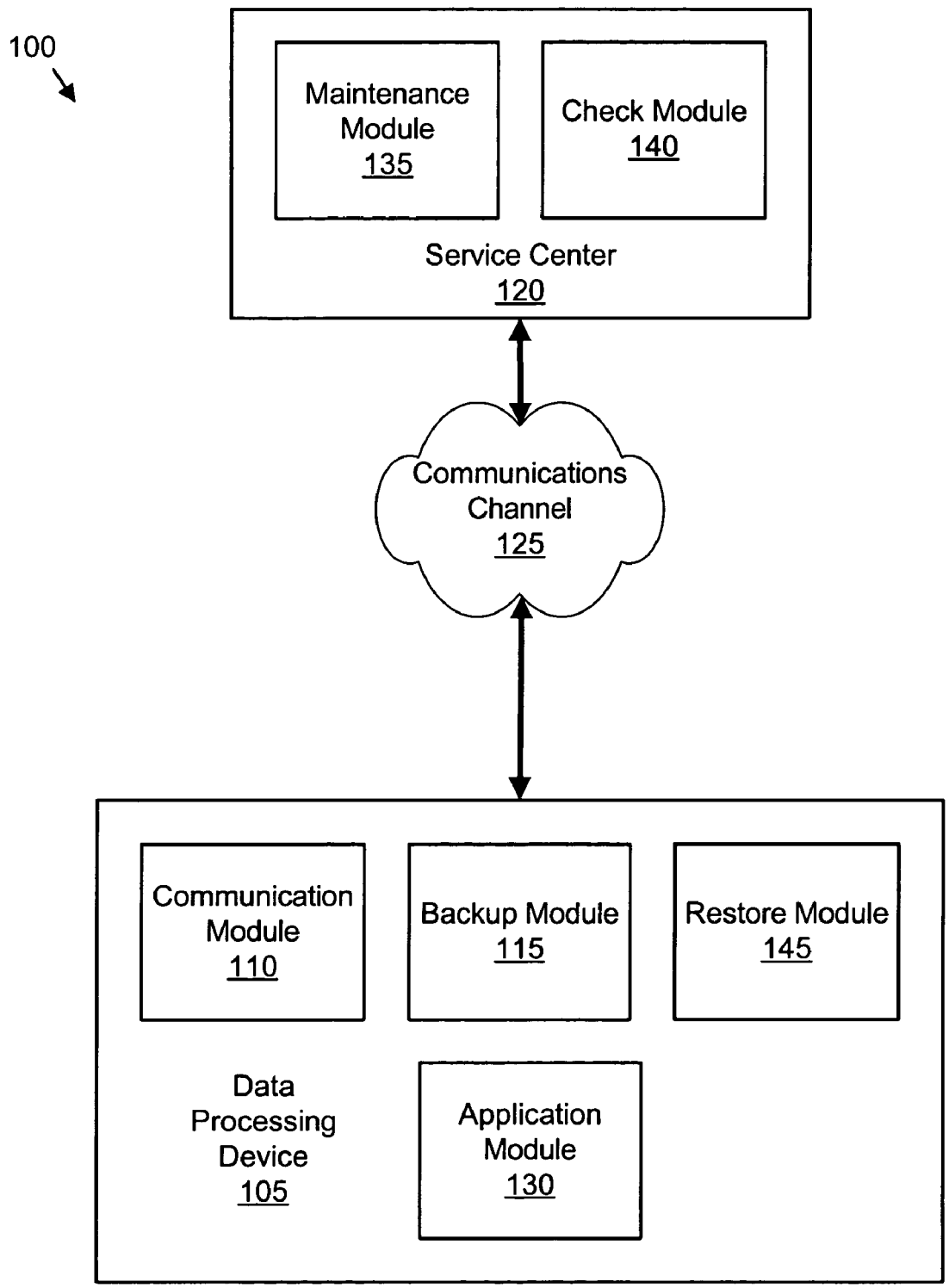
FIG. 1 is a schematic block diagram illustrating one embodiment of a backup system in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory and/or processor devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

A data processing device such as a computer network, disk subsystem, or an automated data storage library may periodically communicate with a service center. The service center may remotely assess the functionality of the data processing device and perform maintenance functions such as upgrading software.

Turning now to the Figures, FIG. 1 is a schematic block diagram illustrating one embodiment of a backup system 100 of the present invention. The system 100 includes a data processing device 105 comprising an application module 130, a communication module 110, a communications channel 125, a backup module 115, and a restore module 145, and a service center 120 comprising a maintenance module 135, and a check module 140.

The data processing device 105 maybe a disk subsystem, an automated data storage library, a Virtual Tape System ("VTS"), a server, a communications switch, or the like. The application module 130 performs a specified function such as maintaining the automated data storage library, backing up data, serving web pages, providing network interconnections, and the like. The data processing device 105 and the application module 130 utilize VPD. For example, the VPD may be physical parameters specific to the automated data storage library such as fiducial coordinates, storage slot offsets, logical partitions, and the like.

The communication module 110 establishes communications through the communications channel 125 between the data processing device 105 and the service center 120. While the communication module 110 is illustrated as being associated with the data processing device 105, the communication module 110 may be associated with the service center 120, or combinations thereof. For example, if the data processing device 105 establishes the communications channel 125, then the communication module 110 may be associated with the data processing device 105. On the other hand, if the service center 120 establishes the communications channel 125, then the communication module 110 may be associated with the service center 120. If both the data processing device 105 and the service center 120 establish the communications channel 125, then the communication module 110 may be associated with both the data processing device 105 and the service center 120. The communications channel 125 maybe a telephone connection, a satellite connection or other wireless connection, a network connection, an Internet connection, an email connection, and the like. In one embodiment, the communication module 110 periodically establishes the communications channel 125 to/from the service center 120.

The service center 120 provides support to the data processing device 105. Support may include performing diagnostic tests, scheduling maintenance, transmitting software upgrades, receiving trace logs, and the like. For example, the service center 120 may determine that a data processing device 105 power supply has failed, schedule a service technician to replace the power supply, and order a replacement power supply. The service center 120 may be configured as computer server as is well known to those skilled in the art.

The backup module 115 copies the VPD from the data processing device 105 to the maintenance module 135 of the service center 120. The maintenance module 135 receives and maintains the VPD copy. Maintaining the VPD copy may comprise storing the VPD copy in nonvolatile storage for later retrieval. In one embodiment, the maintenance module 135 is a software program executed by the service center 120. The backup module 115 may initiate the VPD copy or it may copy the VPD as the result of a request from the maintenance module 135, or combinations thereof. While the backup module 115 is illustrated as being associated with the data processing device 105, it may be associated with the service center 120, or combinations thereof For example, either the data processing device 105 or the service center 120 may establish the communications channel, as discussed above, and either may initiate and/or perform the VPD copy associated with a backup operation.

In one embodiment, the check module 140 establishes communications with the communication module 110 through the communications channel 125 if the communication module has not established communications with the service center 120 within a specified time interval. For example, the communication module 110 may be configured to establish communications with the service center 120 at least every twenty-four (24) hours. The communication module 110 not establishing communications through the communications channel 125 within twenty-four (24) hours may indicate a failure of the data processing device 105. This may trigger a service call to find out why the data processing device 105 has not checked in, or the check module 140 may establish communications with the communication module 110. In addition, the check module 140 may request that the backup module 115 copy the VPD to the maintenance module 135. In a certain embodiment, the check module 140 is a software program executed by the service center 120. The system 100 copies VPD and maintains the VPD copy.

Figure 2:
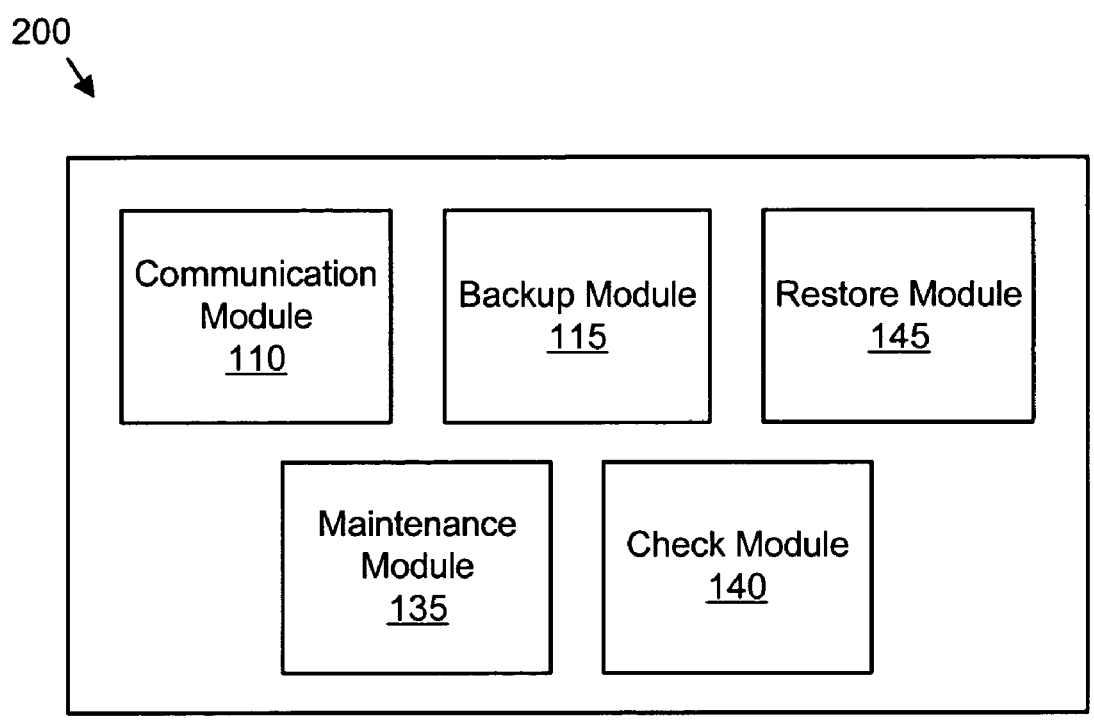
FIG. 2 is a schematic block diagram illustrating one embodiment of a backup apparatus of the present invention.

FIG. 2 is a schematic block diagram illustrating one embodiment of a backup apparatus 200 of the present invention. The apparatus 200 includes a communication module 110, a backup module 115, a maintenance module 135, a check module 140, and a restore module 145.

In one embodiment, a data processing device 105 comprises the communication module 110, the backup module 115, and the restore module 145, and a service center 120 comprises the maintenance module 135 and check module 140. The communication module 110 establishes a communications channel 125 between the backup module 115 and the maintenance module 135. In one embodiment, the communication module 110 uses a multipurpose communications channel 125. For example, the data processing device 105 may comprise an Internet communications channel for communication with a plurality of external devices. The communication module 110 may utilize the Internet communications channel to communicate with the maintenance module 135 of the service center 120. In an alternate embodiment, the communication module 110 uses a dedicated communications channel 125 such as a telephone interface wherein the dedicated communications channel 125 is only used to communicate with the service center 120.

The backup module 115 copies VPD from the data processing device 105 to the maintenance module 135. In one embodiment, the backup module 115 copies the VPD comprising one or more files, data sets, buffers, register values, or parameters specified by a backup script. For example, the backup script may specify that the backup module 115 copy a web server's IP address to the maintenance module 135. In one embodiment, the backup module 115 appends state information to the VPD. The state information may include a time/date stamp. In addition, the state information may include a configuration description. The configuration description may provide a concise description of the configuration of the data processing device 105. For example, the configuration description may list the number of partitions of a storage device. In an alternate embodiment, the maintenance module 135 appends the state information to the VPD copy subsequent to receiving the VPD copy.

The maintenance module 135 maintains the VPD copy. In one embodiment, the maintenance module 135 stores the VPD copy on a fault-tolerant, non-volatile storage device such as an array of independent disks ("RAID"). In addition, the maintenance module 135 may maintain a plurality of VPD copy instances. For example, the maintenance module 135 may maintain each VPD copy received as a separate instance.

While the restore module 145 is illustrated as being associated with the data processing device 105, it may be associated with the service center 120, or combinations thereof. For example, either the data processing device 105 or the service center 120 may establish the communications channel, as discussed above, and either may initiate and/or perform the VPD copy associated with a restore operation. In one embodiment, the restore module 145 receives command to restore the VPD copy to the data processing device 105. The restore module 145 may direct the communication module 110 to establish the communications channel 125 between the restore module 145 and the maintenance module 135. In addition, the restore module 145 requests the VPD copy from the maintenance module 135.

In one embodiment, the restore module 145 specifies a VPD copy instance. The restore module 145 may use state information in specifying the VPD copy instance. For example, the restore module 145 may request the VPD copy instance where the state information indicates that the instance is over seventy-two hours (72) old and has a configuration of seven (7) partitions. Alternatively, an operator, administrator, service personnel, or other person may specify the VPD copy instance through a remote computer or at a user interface of the data processing device. The maintenance module 135 copies the VPD copy to the restore module 115.

In one embodiment, the apparatus includes a check module 140 configured to establish communications with the communication module 110 if the communication module 110 has not established communications with the maintenance module 135 within a specified time interval. The check module 140 may further request that the backup module 115 copy the VPD to the maintenance module 135. The apparatus 200 copies VPD to a service center 120 maintenance module 135 and maintains one or more VPD copy instances at maintenance module 135.

Figure 3:
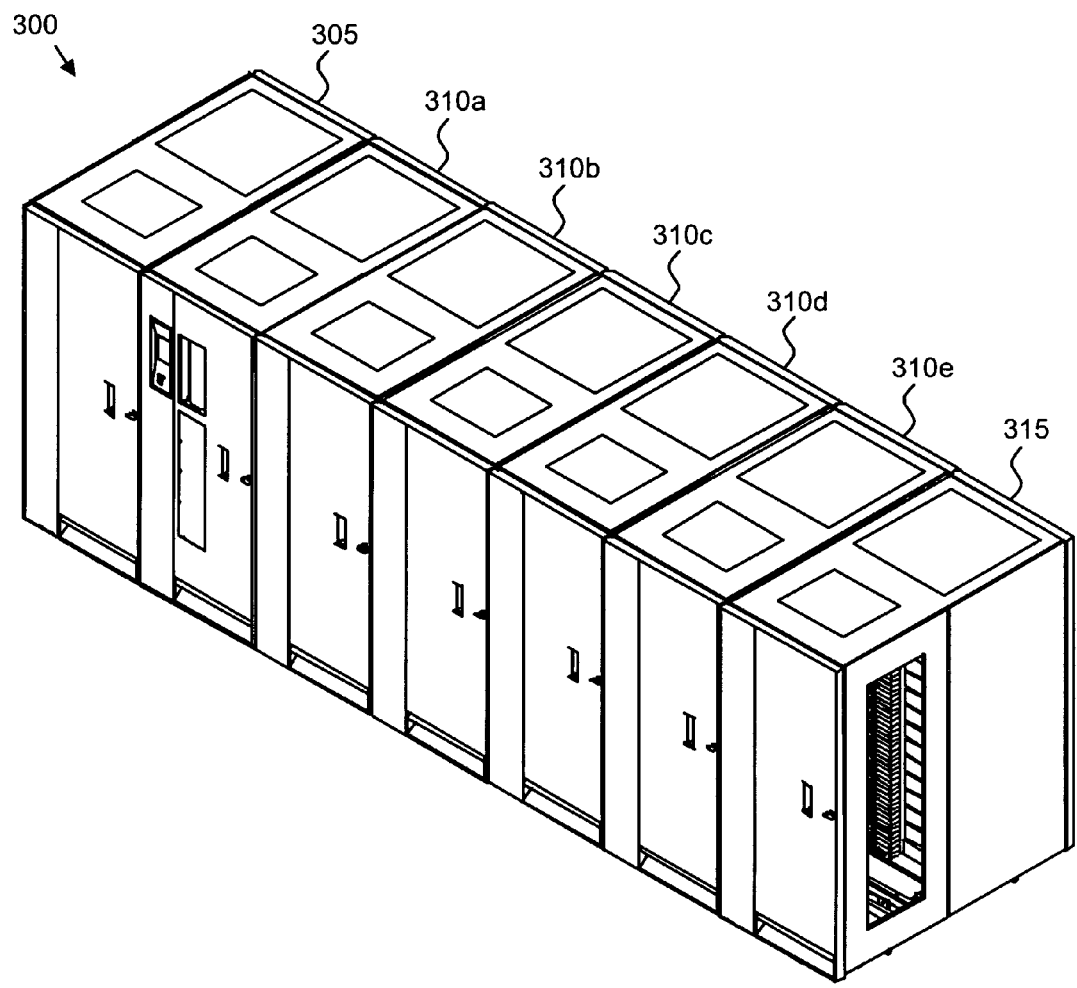
FIG. 3 is an isometric view of an automated data storage library adaptable to implement one embodiment of the present invention.
Figure 4:
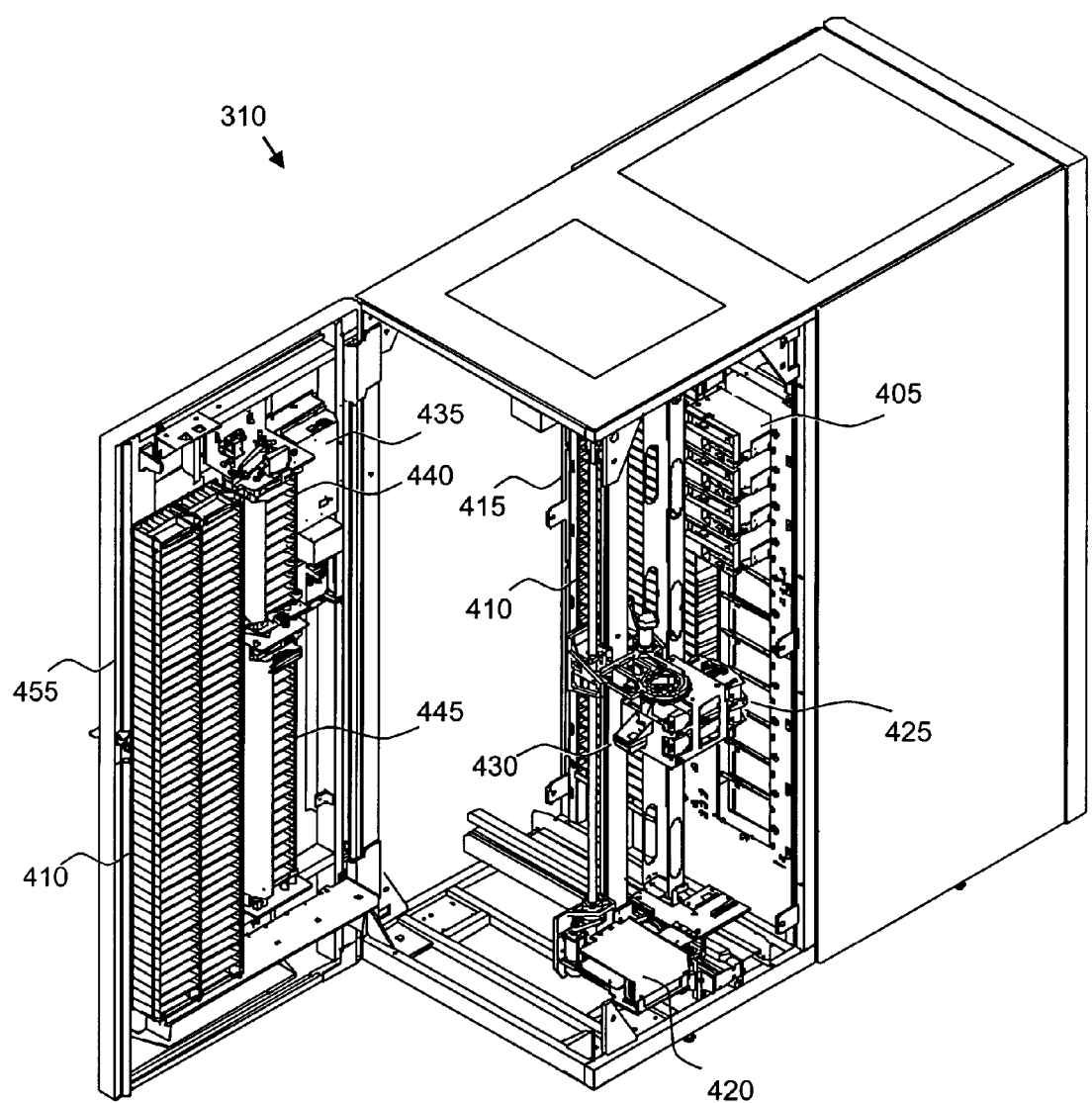
FIG. 4 is an isometric view of a storage frame adaptable to implement one embodiment of the present invention.

FIGS. 3 and 4 illustrate one embodiment of an automated data storage library 300 adaptable to implement the present invention. The library 300 stores and retrieves data storage cartridges containing data storage media in storage shelves 410. It is noted that references to "data storage media" herein refer to data storage cartridges, and for purposes herein the two terms are used synonymously. An example of an automated data storage library 300, which may implement the present invention, and has a configuration as depicted in FIGS. 3 and 4, is the IBM 3584 UltraScalable Tape Library manufactured by International Business Machines ("IBM") of Armonk, N.Y. The library 300 of FIG. 3 comprises a left hand service bay 305, one or more storage frames 310, and right hand service bay 315. As will be discussed, a storage frame 310 may comprise an expansion component of the library 300. Storage frames 310 may be added or removed to expand or reduce the size and/or functionality of the library 300. Storage frames 310 may comprise additional storage shelves, drives, import/export stations, accessors, operator panels, etc.

FIG. 4 is an isometric view of one embodiment of a storage frame 310, which is the base frame of the library 300 and is contemplated to be the minimum configuration of the library 300. In this minimum configuration, there is only a single accessor (i.e., there are no redundant accessors) and there is no service bay. The library 300 is arranged for accessing data storage media in response to commands from at least one external host system. In the depicted embodiment the library 300 comprises a plurality of storage shelves 410 located on a front wall 455 and a rear wall 415 for storing data storage cartridges that contain data storage media; at least one data storage drive 405 for reading and/or writing data with respect to the data storage media; and a first accessor 420 for transporting the data storage media between the plurality of storage shelves 410 and the data storage drive(s) 405. The data storage drives 405 may be optical disk drives or magnetic tape drives, or other types of data storage drives as are used to read and/or write data with respect to the data storage media. The storage frame 310 may optionally comprise an operator panel 435 or other user interface, such as a web-based interface, which allows a user to interact with the library 300. The storage frame 310 may optionally comprise an upper I/O station 440 and/or a lower I/O station 445, which allows data storage media to be inserted into the library 300 and/or removed from the library 300 without disrupting library 300 operation. The library 300 may comprise one or more storage frames 310, each having storage shelves 410 accessible by first accessor 420.

As described above, the storage frames 310 maybe configured with different components depending upon the intended function. One configuration of the storage frame 310 may comprise storage shelves 410, one or more data storage drive 405, and other optional components to store and retrieve data from the data storage cartridges. The first accessor 420 comprises a gripper assembly 425 for gripping one or more data storage media and may include a bar code scanner 430 or other reading system, such as a cartridge memory reader or similar system, mounted on the gripper 425, to "read" identifying information about the data storage media.

In one embodiment, the first accessor 420 is calibrated by being moved to a position aligned with a fiducial such as a printed fiducial mark. The position of first accessor 420 aligned with the fiducial may comprise VPD. In addition, each storage shelve 410 may be assigned to a specified logical library. The assignment of a storage shelve 410 to a logical library may further comprise VPD.

Figure 5:
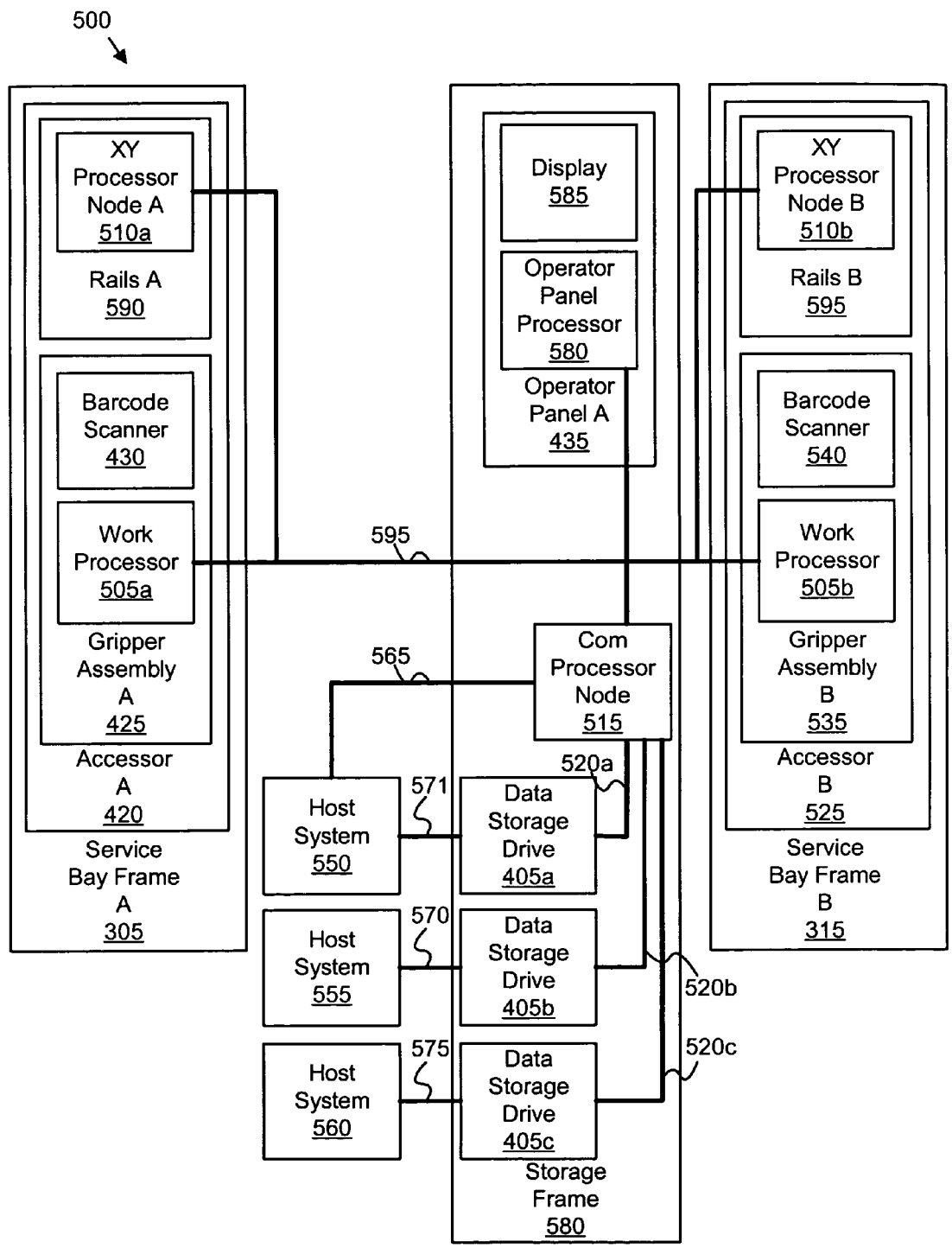
FIG. 5 is a schematic block diagram illustrating an automated data storage library adaptable to implement one embodiment of the present invention.

FIG. 5 illustrates a block diagram of one embodiment of an automated data storage library 500 such as was depicted in FIGS. 3 and 4, which employs a distributed system of modules with a plurality of processor nodes. An example of an automated data storage library which may implement the distributed system depicted in the block diagram of FIG. 5, and which may implement the present invention, is the IBM 3584 UltraScalable Tape Library manufactured by IBM of Armonk, N.Y. While the automated data storage library 500 is described as employing a distributed control system, the present invention may be implemented in automated data storage libraries 500 regardless of control configuration, such as, but not limited to, an automated data storage library 500 having one or more library controllers that are not distributed. The library 500 of FIG. 5 comprises one or more storage frames 580, a left hand service bay 305 and a right hand service bay 315. The left hand service bay 305 is shown with a first accessor 420. As discussed above, the first accessor 420 comprises a gripper assembly 425 and may include a reading system 430 to "read" identifying information about the data storage media. The right hand service bay 315 is shown with a second accessor 525. The second accessor 525 comprises a gripper assembly 535 and may include a reading system 540 to "read" identifying information about the data storage media. Calibration information for the second accessor 525 may also comprise VPD.

In the event of a failure or other unavailability of the first accessor 420, or its gripper 425, etc., the second accessor 525 may perform some or all of the functions of the first accessor 420. The two accessors 420, 525 may share one or more mechanical paths or they may comprise completely independent mechanical paths. In one example, the accessors 420, 525 may have a common horizontal rail with independent vertical rails. The first accessor 420 and the second accessor 525 are described as first and second for descriptive purposes only and this description is not meant to limit either accessor to an association with either the left hand service bay 305, or the right hand service bay 315.

In the exemplary library 500, first accessor 420 and second accessor 525 move their grippers in at least two directions, called the horizontal "X" direction and vertical "Y" direction, to retrieve and grip, or to deliver and release the data storage media at the storage shelves 410 and to load and unload the data storage media at the data storage drives 405. The library 500 receives commands from one or more host systems 550, 555 or 560. The host systems, such as host servers, communicate with the library directly, e.g., on path 565, through one or more control ports, or through one or more data storage drives 405 on paths 570, 571, 575, providing commands to access particular data storage media and move the media, for example, between the storage shelves 410 and the data storage drives 405. The commands are typically logical commands identifying the media and/or logical locations for accessing the media. The terms "commands" and "work requests" are used interchangeably herein to refer to such communications from the host system 550, 555 or 560 to the library 500 as are intended to result in accessing particular data storage media within the library 500.

The exemplary library 500 is controlled by a distributed control system receiving the logical commands from hosts, determining the required actions, and converting the actions to physical movements of first accessor 420 and/or second accessor 525. The distributed control system comprises a plurality of processor nodes, each having one or more processors. In one example of a distributed control system, a communication processor node 515 may be located in a storage frame 580. The communication processor node 515 provides a communication link for receiving the host commands, either directly or through the drives 405, via at least one external interface, e.g., coupled to lines 565, 571, 570, 575.

The communication processor node 515 may additionally provide one or more communication links 520 for communicating with the data storage drives 405. The communication processor node 515 may be located in the frame 580, close to the data storage drives 405. Additionally, in an example of a distributed processor system, one or more additional work processor nodes 505 are provided, which may comprise, e.g., a work processor node 505a that may be located at first accessor 420, and that is coupled to the communication processor node 515 via a network 595. Each work processor node 505 may respond to received commands that are broadcast to the work processor nodes 505 from any communication processor node 515, and the work processor nodes 505 may also direct the operation of the accessors 420, 525 providing move commands. An XY processor node 510 may be provided and may be located at an XY system of first accessor 420. The XY processor node 510 is coupled to the network 595 and is responsive to the move commands, operating the XY system to position the gripper 425.

Also, an operator panel processor node 580 may be provided at the optional operator panel 435 for providing an interface for communicating between the operator panel and the communication processor node 515, the work processor nodes 505, and the XY processor nodes 510.

A network, for example comprising a common bus 595, is provided, coupling the various processor nodes. The network may comprise a robust wiring network, such as the commercially available CAN ("Controller Area Network") bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 515 is coupled to each of the data storage drives 405 of a storage frame 580, via lines 520, communicating with the drives and with host systems 550, 555 and 560. Alternatively, the host systems may be directly coupled to the communication processor node 515, at input 565 for example, or to control port devices (not shown) which connect the library 500 to a host system with a library interface similar to the drive/library interface. As is known to those of skill in the art, various communication arrangements may be employed for communication with the hosts and with the data storage drives. In the example of FIG. 5, host connections 565 and 570 may comprise SCSI busses. Bus 575 may comprise an example of a Fibre Channel bus, which is a high-speed serial data interface, allowing transmission over greater distances than the SCSI bus systems.

The data storage drives 405 may be in close proximity to the communication processor node 515, and may employ a short distance communication scheme, such as SCSI, or a serial connection, such as RS-422. The data storage drives 405 are thus individually coupled to the communication processor node 515 by means of lines 520. Alternatively, the data storage drives 405 may be coupled to the communication processor node 515 through one or more networks, such as a common bus network.

Additional storage frames 580 may be provided, each coupled to the adjacent storage frame. Any of the storage frames 580 may comprise communication processor nodes 515, storage shelves 410, data storage drives 405, and networks 595.

Further, as described above, the automated data storage library 500 may comprise a plurality of accessors. A second accessor 525, for example, is shown in a right hand service bay 315 of FIG. 5. The second accessor 525 may comprise a gripper 535 for accessing the data storage media, and an XY system 595 for moving the second accessor 525. The second accessor 525 may run on the same horizontal mechanical path as first accessor 420, or on an adjacent path.

In FIG. 5 and the accompanying description, the first and second accessors 420, 525 are associated with the left hand service bay 305 and the right hand service bay 315 respectively. This is for illustrative purposes and there may not be an actual association. In addition, depending on the design of the library, it may not be necessary to have a left hand service bay 305 and/or a right hand service bay 315.

Figure 6:
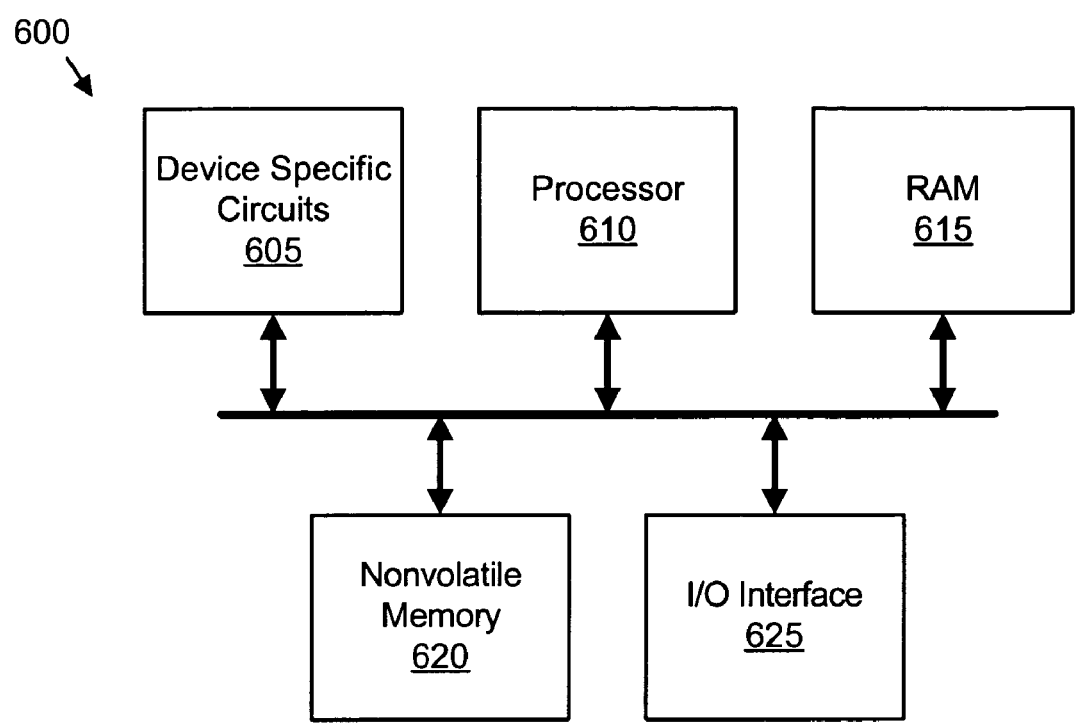
FIG. 6 is a schematic block diagram illustrating a controller adaptable to implement one embodiment of the present invention.

The automated data storage library 500 typically comprises one or more controllers to direct the operation of the automated data storage library 500. Host computers 550, 555, 560 and data storage drives 405 typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 6 shows one embodiment of a controller 600 of the present invention. The controller 600 includes a processor 610, Random Access Memory ("RAM") 615, nonvolatile memory 620, device specific circuits 605, and I/O interface 625. Alternatively, the RAM 615 and/or nonvolatile memory 620 may be contained in the processor 610 as could the device specific circuits 605 and I/O interface 625.

The processor 610 may comprise, for example, an off-the-shelf microprocessor, custom processor, Field Programmable Gate Array ("FPGA"), Application Specific Integrated Circuit ("ASIC"), discrete logic, or the like. The RAM 615 is typically used to hold variable data, stack data, executable instructions, and the like. The nonvolatile memory 620 may comprise any type of nonvolatile memory such as, but not limited to, Electrically Erasable Programmable Read Only Memory ("EEPROM"), flash Programmable Read Only Memory ("PROM"), battery backup RAM, Magnetoresistive Random Access Memory (MRAM), Micro-ElectroMechanical Systems (MEMS) based storage, and hard disk drives. The nonvolatile memory 620 is typically used to hold the executable firmware and any nonvolatile data.

The I/O interface 625 comprises a communication interface that allows the processor 610 to communicate with devices external to the controller. Examples may comprise, but are not limited to, serial interfaces such as RS-232, Universal Serial Bus ("USB") or Small Computer Systems Interface ("SCSI"). The device specific circuits 605 provide additional hardware to enable the controller 600 to perform unique functions such as, but not limited to, motor control of a cartridge gripper. The device specific circuits 605 may comprise electronics that provide, by way of example but not limitation, Pulse Width Modulation ("PWM") control, Analog to Digital Conversion ("ADC"), Digital to Analog Conversion ("DAC"), and the like. In addition, all or part of the device specific circuits 605 may reside outside the controller 600.

Aspects of the invention may be implemented with a controller. A controller may comprise one or more dedicated processors, computers, or controllers. In addition, a controller may comprise one or more processor nodes of a distributed control system, such as the distributed control system depicted in FIG. 5. For example, the controller may comprise communication processor node 530, or it may comprise work processor node 534, etc. Alternatively, the controller may comprise a combination of two or more processor nodes. Herein, the controller may comprise a single processor or controller or it may comprise multiple processors or controllers.

In one embodiment, the backup module 115 and the restore module 145 are configured as firmware stored in the nonvolatile memory 620 and executing from Processor 610 and RAM 615 of the controller 600. In addition, the communication module 110 may comprise the I/O interface 625.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
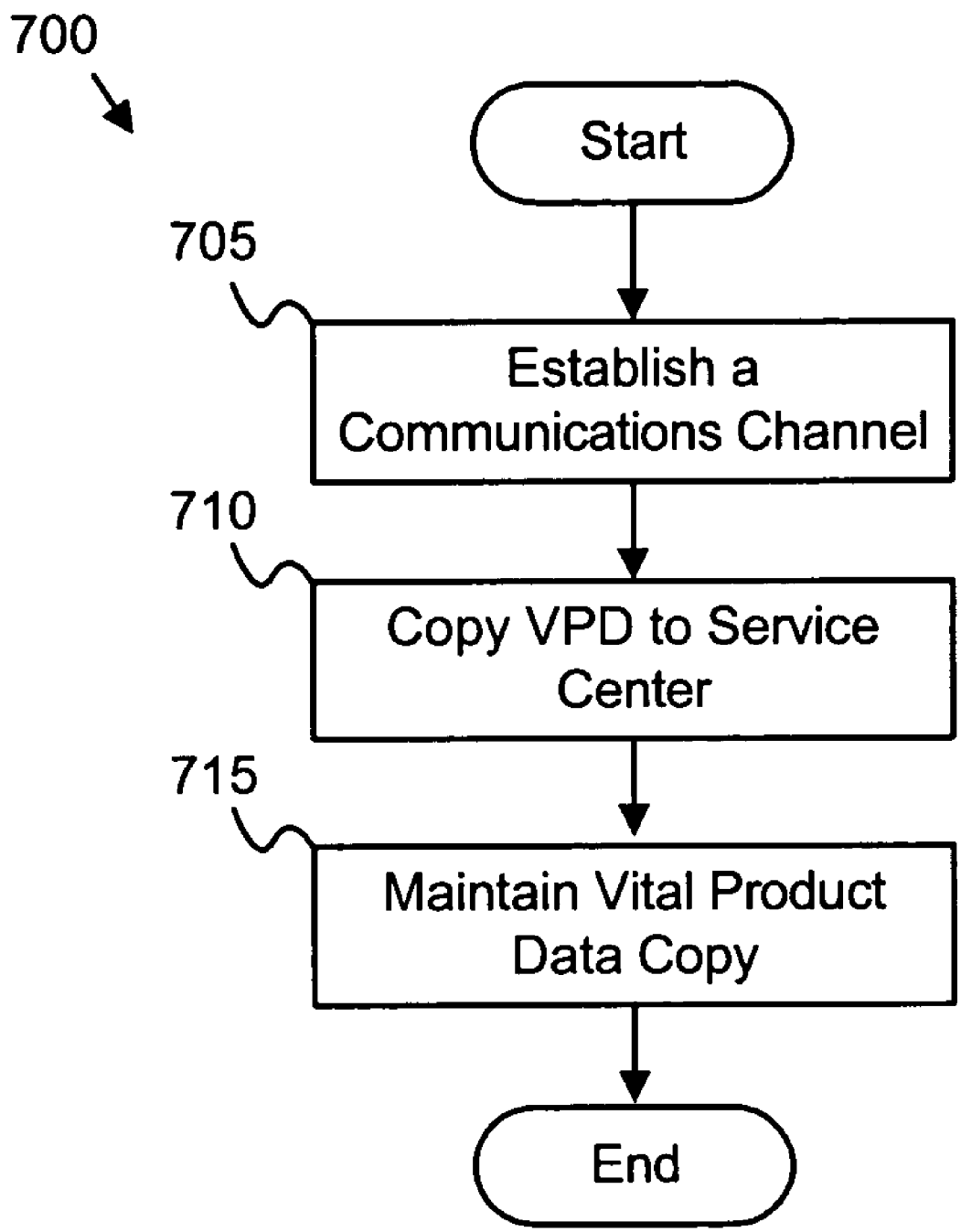
FIG. 7 is a schematic flow chart diagram illustrating one embodiment of a backup method in accordance with the present invention.

FIG. 7 is a schematic flow chart diagram illustrating one embodiment of a backup method 700 in accordance with the present invention. In accordance with the method, a communication module 110 establishes 705 a communications channel 125 between a backup module 115 and a maintenance module 135. In one embodiment, the communication module 110 establishes the communications channel 125 in response to an administrator command. In an alternate embodiment, the communication module 110 establishes the communications channel 125 in response to an automated command. For example, the communication module 110 may establish the communications channel 125 in response to an automated command received every twenty-four (24) hours. Alternatively, the communication module 110 may establish the communications channel 125 in response to a failure or error of the data processing device 105.

In one embodiment, a check module 140 establishes 705 the communications channel 125 with the communication module 110. For example, but without limitation, if the communication module 110 has not established the communications channel 125 with the maintenance module 135 within a specified time interval such as one (1) hour, the check module 140 may establish the communications channel 125.

A backup module 115 copies 710 VPD to the maintenance module 135. In one embodiment, the VPD is specified in a command. In an alternate embodiment, the VPD is specified in a backup script. In addition, the backup script may specify when the communication module 110 should establish 705 the communications channel 125 with the maintenance module 135. In one embodiment, the backup module 115 appends status information to the VPD. In one embodiment, the backup module 115 creates a VPD file that includes the status information. In an alternate embodiment, the backup module 115 creates a status information file and includes the status information file with one or more VPD files copied 710 to the maintenance module 135.

The maintenance module 135 maintains 715 the VPD copy. In one embodiment, the maintenance module 135 maintains 715 a plurality of VPD copy instances. For example, the maintenance module 135 may maintain 715 each VPD copy instance received. In an alternate embodiment, the maintenance module 135 maintains 715 the VPD copy instances according to a specified algorithm. For example, the maintenance module 135 may maintain 715 each VPD copy instance received in the last ninety (90) days, and every tenth VPD copy instance received earlier than ninety (90) days. The method 700 backups up VPD to a maintenance module 135 of a remote service center 120.

Figure 8:
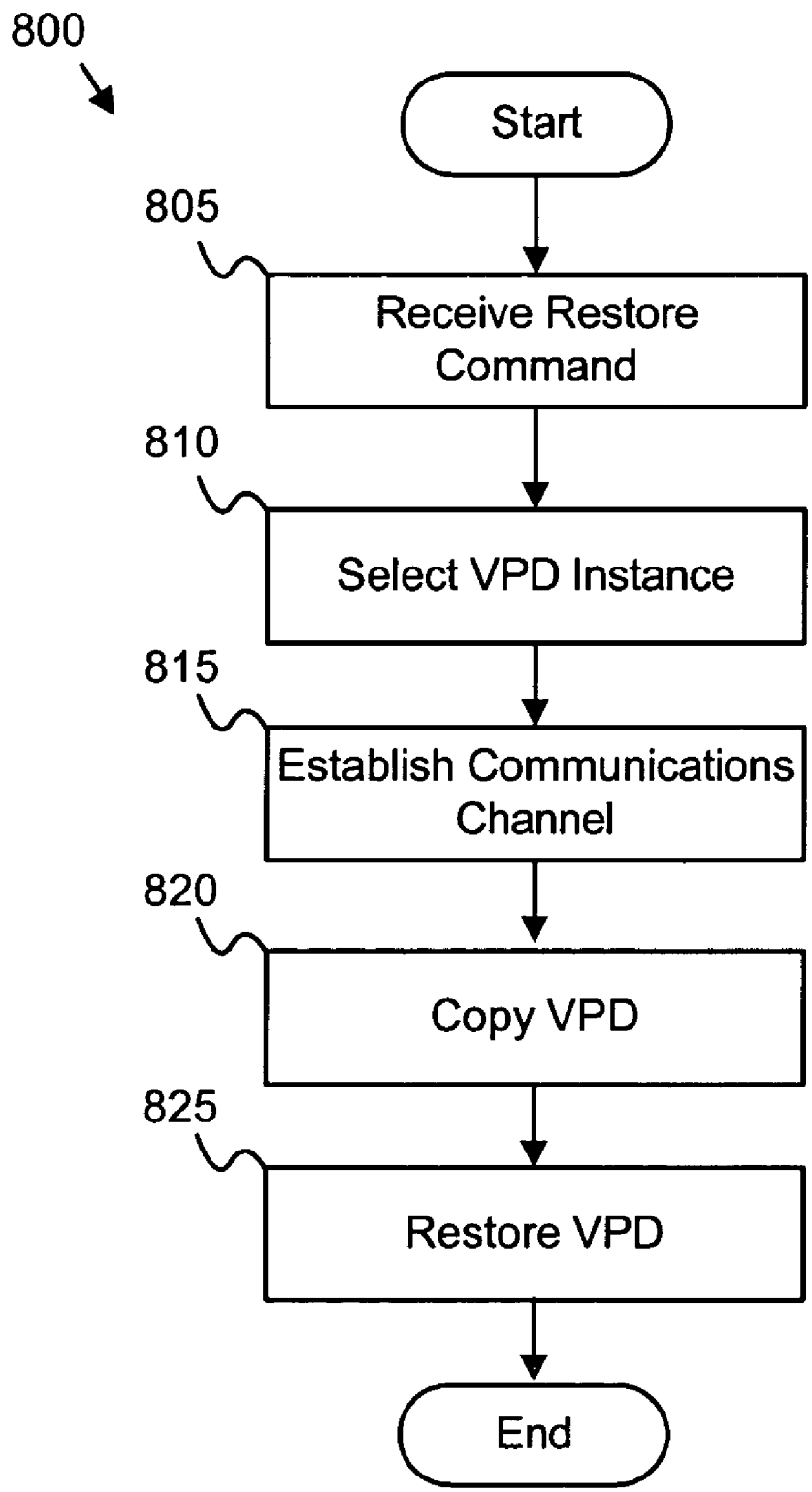
FIG. 8 is a schematic flow chart diagram illustrating one embodiment of a restore method in accordance with the present invention.

FIG. 8 is a schematic flow chart diagram illustrating one embodiment of a restore method 800 of the present invention. Under the method, the restore module 145 receives 805 a restore command. An administrator, service person, operator, etc. may issue the restore command. In an alternate embodiment, the restore module 145 may generate the restore command in response to a specified condition such as an error condition or error message.

The restore module 145 may further select 810 a specific VPD copy instance. In one embodiment, the command specifies the VPD copy instance and the restore module 145 selects the specified VPD copy instance. In a certain embodiment, the restore module 145 queries the maintenance module 135 for VPD copy status information and selects the VPD copy instance based on the status information. For example, the restore module 145 may identify a VPD copy instance copied prior to a major configuration change and specify the identified VPD copy instance.

The restore module 145 directs the communication module 110 to establish 815 a communications channel 125 between the restore module 145 and the maintenance module 135. The maintenance module 135 further copies 820 the VPD copy to the restore module 145. In one embodiment, the restore module 145 restores 825 the VPD copy instance as the data processing device's 105 VPD. For example, the restore module 145 may overwrite part or all of the current VPD with the selected VPD copy instance. The method 800 restores a VPD copy to a data processing device 105.

Figure 9:
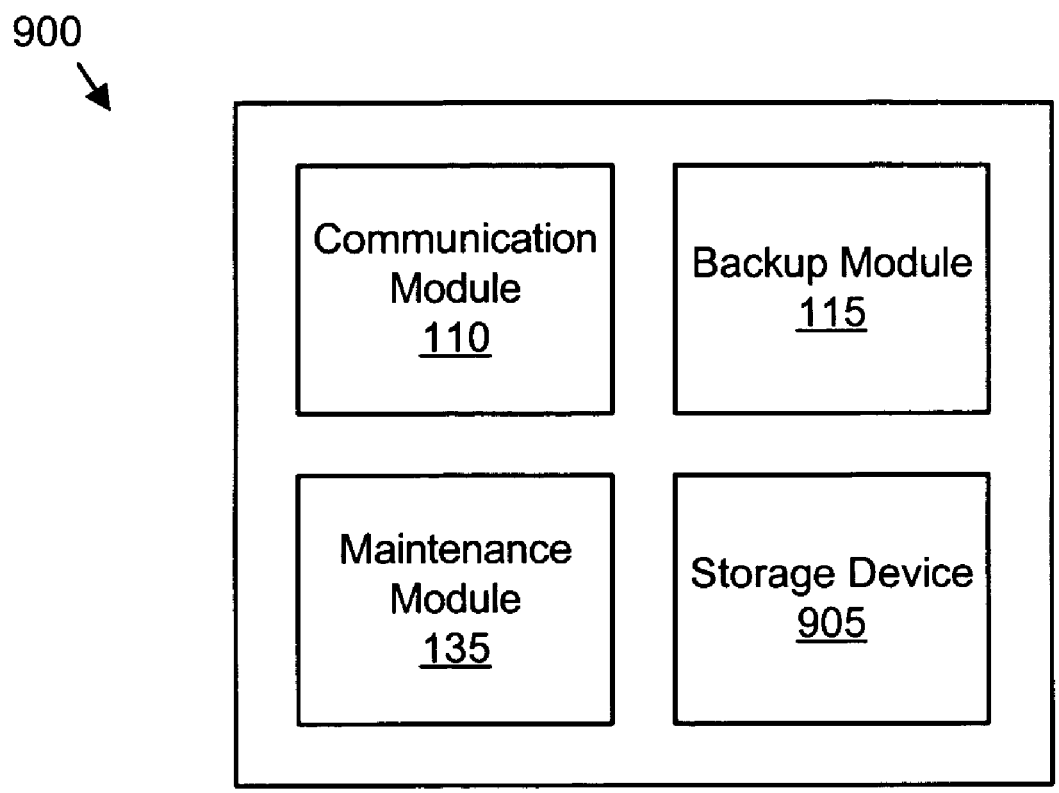
FIG. 9 is a schematic block diagram illustrating one alternate embodiment of a service center of the present invention.

FIG. 9 is a schematic block diagram illustrating one alternate embodiment of a co service center 900 of the present invention. The service center 900 may be a server the configuration of which is well known to those skilled in the art. A communication module 110 establishes a communications channel 125 with a data processing device 105. In one embodiment, the service center 900 initiates the communication. In another embodiment, the data processing device 105 initiates the communication. The backup module 115 identifies and copies VPD from the data processing device 105 to the maintenance module 135. In one embodiment, the backup module 115 identifies the VPD from a backup script. The maintenance module 135 maintains the VPD copy on the storage device 905.

Figure 10:
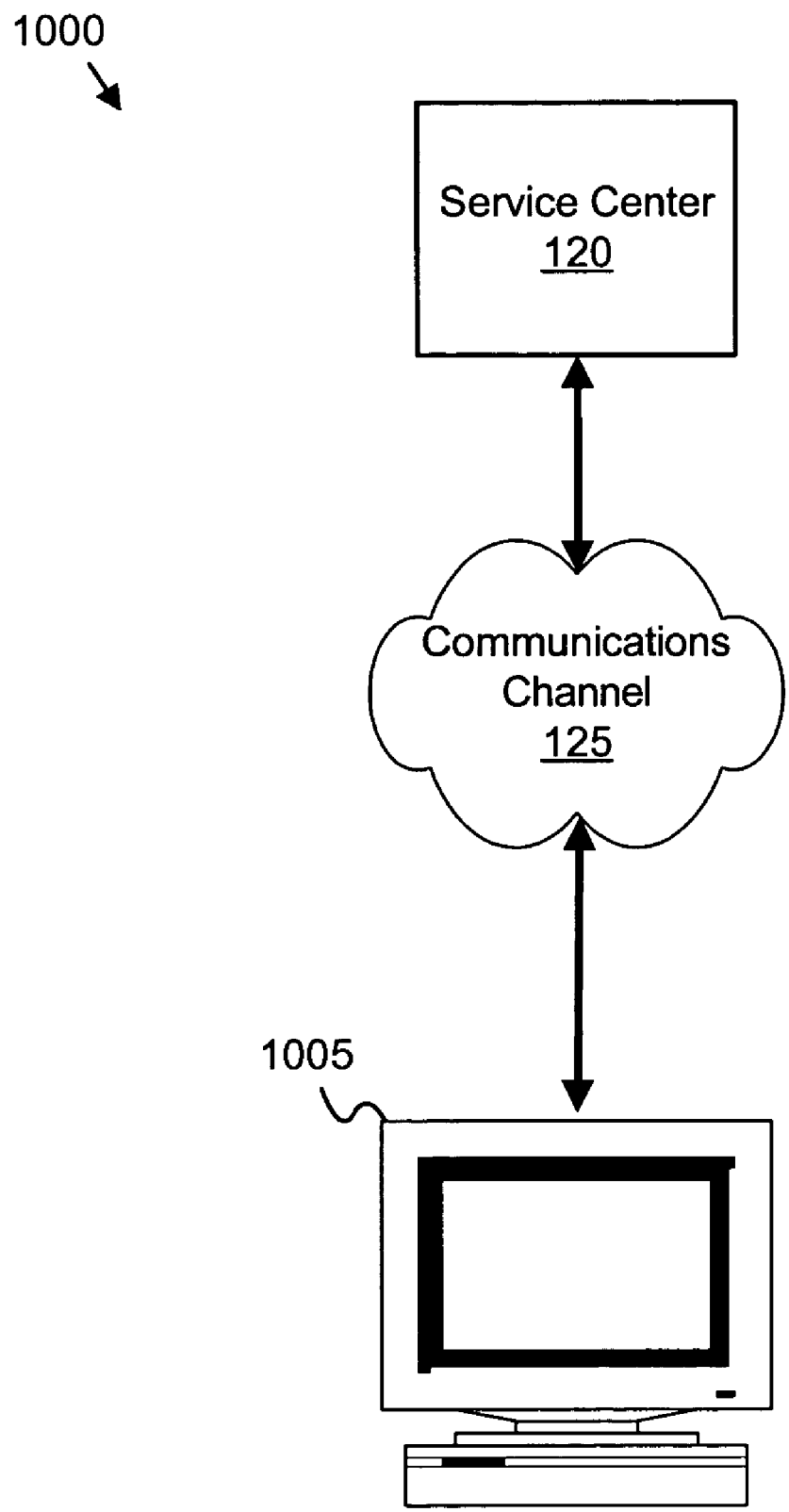
FIG. 10 is a schematic block diagram illustrating one embodiment of a computer backup system of the present invention.

FIG. 10 is a schematic block diagram illustrating one embodiment of a computer backup system 1000 of the present invention. A data processing device 1005 may be a remote computer, a communications switch, a factory automation node, a controller for a computer system, and the like. A communications channel 110 of the data processing device 1005 is in communication with a service center 120 through a communications channel 125. The data processing device 1005 may communicate with the service center 120 periodically. Alternatively, the data processing device 1005 may communicate with the service center 120 when connecting to a network. The data processing device 1005 includes VPD. A backup module 115 executing on the data processing device 1005 may copy the VPD to a maintenance module 135 of the service center 120, and the maintenance module 135 maintains the VPD copy.

The present invention is the first to backup a data processing device's 105 VPD by copying the VPD to a service center 120 configured to provide support for the data processing device 105. In addition, the present invention may restore the VPD to the data processing device 105. The present invention is also the first to request a copy of VPD from the data processing device 105 if the data processing device 105 does not communicate with the service center 120 within a specified time interval. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to backup Vital Product Data (VPD), the apparatus comprising:

a communication module comprising executable code stored on a storage device, executed by a processor, and configured to establish a communications channel between an automated data storage library and a service center that is configured to provide support for the automated data storage library, the support comprising performing diagnostic tests, scheduling maintenance, transmitting software upgrades, and receiving trace logs;

a backup module comprising executable code stored on the storage device, executed by the processor, and configured to copy VPD from the automated data storage library to the service center, wherein the VPD comprises physical parameters specific to the automated data storage library comprising fiducial coordinates, storage slot offsets, and logical partitions;

a maintenance module comprising executable code stored on a service center storage device, executed by a service center processor, and configured to receive and maintain the VPD copy; and a check module comprising executable code stored on the service center storage device, executed by the service center processor, and configured to reestablish communications through the communication channel with the communication module if the communication module has not established communications with the service center within a specified time interval and request the backup module to copy the VPD to the maintenance module.

2. The apparatus of claim 1, further comprising a restore module comprising executable code stored on the storage device, executed by the processor, and configured to receive a command to restore the VPD copy to the automated data storage library, direct the communication module to establish the communications channel between the automated data storage library and the service center, and copy the VPD from the maintenance module to the automated data storage library.

3. The apparatus of claim 2, wherein the restore module generates the command responsive to a specified condition.

4. The apparatus of claim 2, wherein the backup module is further configured to append state information to the VPD, the state information comprising a time stamp and a number of partitions for the automated data storage library.

5. The apparatus of claim 4, wherein the maintenance module is configured to maintain a plurality of VPD copy instances.

6. The apparatus of claim 5, wherein the restore module is further configured to select a VPD copy instance for copying from the maintenance module to the automated data storage library using the state information.

7. The apparatus of claim 1, wherein the backup module is configured to determine that modifications have been made to the VPD, and responsive to the modifications direct the communication module to establish communications between the automated data storage library and the service center and copy the VPD from the automated data storage library to the maintenance module.

8. A service center configured to backup VPD, the service center providing support to an automated data storage library by performing diagnostic tests, scheduling maintenance, transmitting soft ware upgrades, and receiving trace logs, the service center comprising:

a storage device configured to store and retrieve VPD, wherein the VPD comprises physical parameters specific to the automated data storage library comprising fiducial coordinates, storage slot offsets, and logical partitions;

a communication module comprising executable code stored on a semiconductor device, executed by a processor, and configured to establish a communications channel with the automated data storage library;

a backup module comprising executable code stored on the semiconductor device, executed by the processor, and configured to copy VPD from the automated data storage library; and a maintenance module comprising executable code stored on the semiconductor device, executed by the processor, and configured to receive and maintain the VPD copy; and a check module comprising executable code stored on the semiconductor device, executed by the processor, and configured to reestablish communications through the communications channel with the automated data storage library if the automated data storage library has not established communications with the communications module within a specified time interval and request the backup module to copy the VPD to the maintenance module.

9. A system to backup VPD, the system comprising:
an automated data storage library configured to perform a data function and comprising
a communication module comprising executable code stored on a storage device, executed by a processor, and configured to establish a communications channel between the automated data storage library and a service center; and
a backup module comprising executable code stored on the storage device, executed by the processor, and configured to copy VPD from the automated data storage library to the service center, wherein the VPD comprises physical parameters specific to an automated data storage library comprising fiducial coordinates, storage slot offsets, and logical partitions;
the service center configured to provide support for the automated data storage library, the support comprising performing diagnostic tests, scheduling maintenance, transmitting software upgrades, and receiving trace logs, the service center comprising
a maintenance module comprising executable code stored on a service center storage device, executed by a service center processor, and configured to receive and maintain the VPD backup copy; and
a check module comprising executable code stored on the service center storage device, executed by the service center Processor, and configured to establish communications through the communications channel with the communication module if the communication module has not established communications with the service center within a specified time interval and request the backup module to copy the VPD to the maintenance module.

10. The system of claim 9, the automated data storage library further comprising a restore module comprising executable code stored on the storage device, executed by the processor, and configured to receive a command to restore the VPD copy to the automated data storage library, direct the communication module to establish the communications channel between the automated data storage library and the service center, and copy the VPD from the maintenance module to the automated data storage library.

11. The system of claim 9, wherein the communications channel is configured as a telephone connection.

12. The system of claim 9, wherein the communications channel is configured as an Internet connection.

13. A program of executable code stored on a plurality of storage devices and executed by a plurality of processors to perform operations to backup VPD, the operations comprising:
establishing a communications channel between an automated data storage library and a service center after a specified time interval if communications have not been established between the automated data storage library and the service center within the specified time interval, the service center configured to provide support for the automated data storage library, the support comprising performing diagnostic tests, scheduling maintenance, transmitting software upgrades, and receiving trace logs;
copying VPD from the automated data storage library to the service center, wherein the VPD comprises physical parameters specific to the automated data storage library comprising fiducial coordinates, storage slot offsets, and logical partitions; maintaining the VPD copy;
reestablishing communications from the service center through the communications channel with the automated data storage library if the automated data storage library has not established communications with the service center within a specified time interval; and
requesting the automated data storage library to copy the VPD to the service center.

14. The program of claim 13, further comprising:
receiving a command to restore the VPD copy to the automated data storage library;
establishing the communications channel between the automated data storage library and the service center; and
copying the VPD copy from the service center to the automated data storage library.

15. The program of claim 14, wherein the command is configured as an administrator command.

16. The program of claim 14, further comprising operations to automatically issue the command.

17. The program of claim 14, further comprising operations to append state information to the VPD, the state information comprising a time stamp and a number of partitions for the automated data storage library.

18. The program of claim 17, further comprising operations to maintain a plurality of VPD copy instances.

19. The program of claim 18, further comprising operations to select a VPD copy instance for copying from the service module to the automated data storage library using the state information.

20. The program of claim 14, further comprising operations to determine that modifications have been made to the VPD, and responsive to the modifications establish communications between the automated data storage library and the service center and copy the VPD from the automated data storage library to the service center.

21. A method for backing up VPD, the method comprising:
establishing a communications channel between an automated data storage library and a service center after a specified time interval if communications have not been established between the automated data storage library and the service center within the specified time interval, the service center configured to provide support for the automated data storage library, the support comprising performing diagnostic tests, scheduling maintenance, transmitting software upgrades, and receiving trace logs;
copying VPD from the automated data storage library to the service center, wherein the VPD comprises physical parameters specific to the automated data storage library comprising fiducial coordinates, storage slot offsets, and logical partitions;
maintaining the VPD copy;
reestablishing communications from the service center through the communications channel with the automated data storage library if the automated data storage library has not established communications with the service center within a specified time interval; and
requesting the automated data storage library to copy the VPD to the service center.

22. The method of claim 21, wherein the method further comprising:
receiving a command to restore the VPD copy to the automated data storage library;
establishing the communications channel between the automated data storage library and the service center; and
copying the VPD copy from the service center to the automated data storage library.

23. The method of claim 21, further comprising appending state information to the VPD, the state information comprising a time stamp and a number of partitions for the automated data storage library.

24. An apparatus to back up VPD, the apparatus comprising:
- means for establishing a communications channel between an automated data storage library and a service center configured to provide support for the automated data storage library, the support comprising performing diagnostic tests, scheduling maintenance, transmitting software upgrades, and receiving trace logs, the establishing means comprising executable code stored on a storage device and executed by a processor;
- means for copying VPD from the automated data storage library to the service center, wherein the VPD comprises physical parameters specific to the automated data storage library comprising fiducial coordinates, storage slot offsets, and logical partitions, the automated data storage library copying means comprising executable code stored on the storage device and executed by the processor;
- means for maintaining the VPD, the maintaining means comprising executable code stored on a service center storage device and executed by a service center processor;
- means for receiving a command to restore the VPD copy to the automated data storage library, the receiving means comprising executable code stored on the storage device and executed by the processor;
- means for reestablishing the communications channel between the automated data storage library and the service center, the reestablishing means comprising executable code stored on the storage device and executed by the processor;
- means for copying the VPD from the service center to the automated data storage library, the service center copying means comprising executable code stored on the storage device and executed by the processor; and
- means for checking if the establishing means have established communications with the service center within a specified time interval, reestablishing communications from the service center through the communications channel with the automated data storage library, and requesting the automated data storage library copying means to copy the VPD to the maintaining means, the checking means comprising executable code stored on the service center storage device and executed by the service center processor.

25. The apparatus of claim 1, wherein the specified time interval is 24 hours.

26. The apparatus of claim 1, wherein the specified time interval is one hour.

27. The apparatus of claim 1, wherein the automated data storage library is an IBM 3584 UltraScalable Tape Library.

28. The apparatus of claim 1, wherein the maintenance module maintains each VPD copy instance received in the last 90 days and each tenth VPD copy instance received earlier than 90 days.

29. The apparatus of claim 6, wherein the restore module selects the VPD copy instance using the time stamp and the number of instances.

* * * * *